J. S. Jennings,

Chamber Pail.

No. 97,516. Patented Dec. 7, 1869.

Witnesses:
Frank B. Whitten
Alex. F. Roberts

Inventor:
J. S. Jennings
By Munn & Co.
Attorneys

United States Patent Office.

JOHN S. JENNINGS, OF BROOKLYN, NEW YORK.

Letters Patent No. 97,516, dated December 7, 1869.

IMPROVEMENT IN CHAMBER-PAILS.

The Schedule referred to in these Letters Patent and making part of the same.

*To all whom it may concern:*

Be it known that I, JOHN S. JENNINGS, of Brooklyn, in the county of Kings, and State of New York, have invented a new and useful Improvement in Chamber-Pails; and I do hereby declare that the following is a full, clear, and exact description thereof, which will enable others skilled in the art to make and use the same, reference being had to the accompanying drawings, forming part of this specification.

This invention relates to improvements in chamber-pails, and consists in the relative form and construction of the cover, spout, and receiving-chamber.

The improvement in the covers consists in forming the circular part for the top of the pail and the projection for the spout in one piece, and in so stamping them in dies or other presses as to form the flange which sits down within the top of the pail, to hold the cover on, by sinking it down from the metal.

The cover $a$ is made circular for the most part, but with a projection, B, at one side, shaped to cover the top of the spout C.

It is placed in dies, and stamped or pressed so as to make an annular projection, D, at the under side, to form the flange for setting down into the pail, and which is commonly made of a separate piece, and attached by soldering one edge to the under side of the cover.

This improved construction makes a much stronger and more durable cover, and better adapted for pouring out the contents of the pail, by turning the cover around on the pail, so as to move the part B off the spout, which is sometimes done, as the flange in this case is so shaped that it will not catch any substance floating in the pail when being so poured out, as the flanges do when arranged in the old way.

Figure 1:
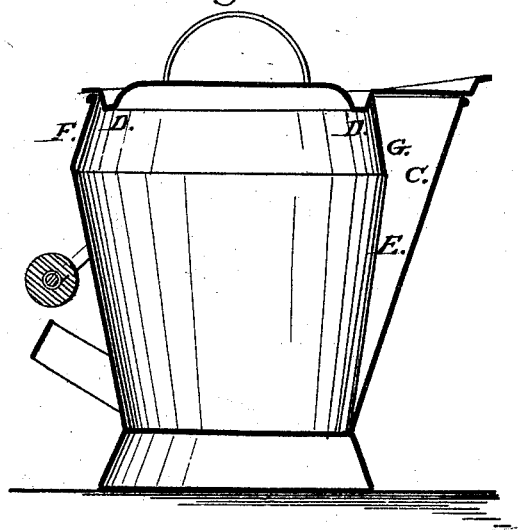
Figure 2:
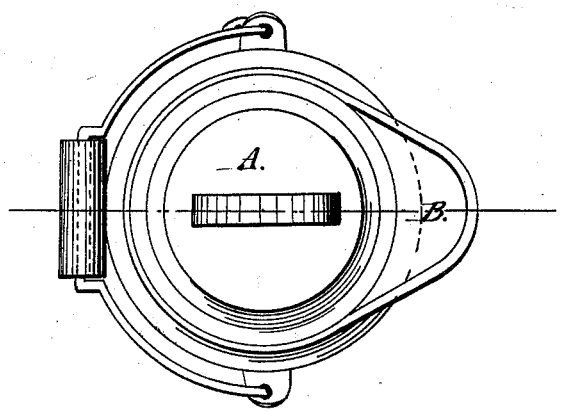

I make the spout C by swelling the side of the pail outward from the bottom to the top, as shown in Figure 1, beyond the regular curvature indicated by the line E.

I also extend this swelled-out part to the top of the pail, joining the ends of the breast F to it at G.

The improved cover which I have here described is applicable to pails made with short spouts projecting from the breast, as well as to the arrangement here shown. I propose to use it with such pails.

I have thus described, in accordance with the requirements of the law, one mode of producing my improved pail, and that which I preferably employ; but I am aware that the method of giving form to sheet-metal by striking it up in dies, is old and well known.

Having thus described my invention,

I claim as new, and desire to secure by Letters Patent—

1. A pail, provided with a receiving-chamber and spout, formed of one continuous sheet of metal, and shaped as shown and described.

2. A pail, combining a cover, D, extending over the spout, and a receiving-chamber and spout in one piece, each of said parts being constructed, with respect to the others, in the manner described.

The above specification of my invention signed by me, this 4th day of August, 1869.

JOHN S. JENNINGS.

Witnesses:
GEO. W. MABEE,
ALEX. F. ROBERTS.